(12) United States Patent
Max et al.

(10) Patent No.: US 11,584,362 B2
(45) Date of Patent: Feb. 21, 2023

(54) METHOD FOR OPERATING A TRANSPORTATION VEHICLE AND A CONTROL UNIT FOR CARRYING OUT THE METHOD

(71) Applicant: VOLKSWAGEN AKTIENGESELLSCHAFT, Wolfsburg (DE)

(72) Inventors: Stephan Max, Gifhorn (DE); Kristian Weiss, Berlin (DE); Sascha Bauer, Berlin (DE); Mehmet Eylem Kirlangic, Wolfsburg (DE); Andreas Wege, Berlin (DE); Robert Konnopka, Berlin (DE); Lars Krüger, Schorfheide (DE); Jesko Klandt, Berlin (DE); Christian Tendyck, Berlin (DE)

(73) Assignee: Volkswagen Aktiengesellschaft

( * ) Notice: Subject to any disclaimer, the term of this patent is extended or adjusted under 35 U.S.C. 154(b) by 814 days.

(21) Appl. No.: 16/332,300

(22) PCT Filed: Jul. 27, 2017

(86) PCT No.: PCT/EP2017/069063
§ 371 (c)(1),
(2) Date: Mar. 11, 2019

(87) PCT Pub. No.: WO2018/046177
PCT Pub. Date: Mar. 15, 2018

(65) Prior Publication Data
US 2021/0284131 A1    Sep. 16, 2021

(30) Foreign Application Priority Data
Sep. 12, 2016    (DE) .................. 10 2016 217 330.8

(51) Int. Cl.
*B60W 30/06* (2006.01)
*G05D 1/02* (2020.01)
*G07C 5/02* (2006.01)

(52) U.S. Cl.
CPC .......... *B60W 30/06* (2013.01); *G05D 1/0214* (2013.01); *G07C 5/02* (2013.01)

(58) Field of Classification Search
CPC ........ B60W 30/06; G05D 1/0214; G07C 5/02
See application file for complete search history.

(56) References Cited

U.S. PATENT DOCUMENTS 8,634,980 B1 *  1/2014  Urmson ............... G05D 1/0055
                                                 701/23
9,140,553 B2 *  9/2015  Grimm ................ B62D 15/027
(Continued)

FOREIGN PATENT DOCUMENTS

CN        1737500 A      2/2006
CN      104340222 A      2/2015
(Continued)

OTHER PUBLICATIONS

Bosche US announces new autonomous parking technology, just-auto global news, Jun. 8, 2016, Aroq Limited (Year: 2016).*
(Continued)

*Primary Examiner* — Michael A Berns
(74) *Attorney, Agent, or Firm* — Barnes & Thornburg LLP (57) ABSTRACT

A method for operating a transportation vehicle, in particular, for driving the transportation vehicle into a predefined parking space, wherein a first trajectory for automated travel of the transportation vehicle into the predefined parking space is stored in a vehicle-side memory device, which trajectory has been detected during manual travel of the transportation vehicle into the predefined parking space and (Continued)

the first trajectory is assigned tolerance values for a deviation from the first trajectory, which is the maximum deviation by which the transportation vehicle deviates from the first trajectory during automated travel into the predefined parking space, wherein, in the case of at least one further instance of manual travel of the transportation vehicle into the predefined parking space, the further trajectory which is travelled along is detected automatically and the first trajectory and the further trajectory are compared with one another.

21 Claims, 1 Drawing Sheet

(56) References Cited

U.S. PATENT DOCUMENTS

| | | | | |
|---|---|---|---|---|
| 9,274,527 | B2* | 3/2016 | Kim | G05D 1/0238 |
| 9,429,943 | B2* | 8/2016 | Wilson | G05D 1/0246 |
| 9,599,482 | B2* | 3/2017 | Maise | H04W 4/027 |
| 10,399,565 | B2* | 9/2019 | Posch | B60W 30/14 |
| 10,710,633 | B2* | 7/2020 | Carlson | B62D 15/0285 |
| 2005/0206231 | A1* | 9/2005 | Lu | B60W 30/02 303/146 |
| 2013/0085637 | A1* | 4/2013 | Grimm | B60W 30/06 701/25 |
| 2015/0285645 | A1* | 10/2015 | Maise | H04W 4/029 701/25 |
| 2018/0194344 | A1* | 7/2018 | Wang | G05D 1/0236 |
| 2018/0281859 | A1* | 10/2018 | Derendarz | G05D 1/0285 |
| 2021/0284131 | A1* | 9/2021 | Max | G07C 5/02 |

FOREIGN PATENT DOCUMENTS

| | | | | |
|---|---|---|---|---|
| CN | 104512463 | A | | 4/2015 |
| CN | 105579320 | A | | 5/2016 |
| CN | 105679068 | A | | 6/2016 |
| DE | 10354661 | A1 | | 6/2005 |
| DE | 102008002598 | A1 | | 1/2009 |
| DE | 102010011591 | A1 * | 9/2011 | ......... B62D 15/0285 |
| DE | 102011107974 | A1 | | 1/2013 |
| DE | 102011113916 | A1 * | 3/2013 | ........... B62D 15/027 |
| DE | 102012007127 | A1 * | 3/2013 | ........... B60W 30/10 |
| DE | 102013015348 | A1 | | 4/2014 |
| DE | 102013015349 | A1 | | 4/2014 |
| DE | 102014018192 | A1 * | 6/2015 | ........... B60W 30/06 |
| DE | 102014216577 | A1 * | 2/2016 | ........... B60W 30/06 |
| DE | 102015202466 | A1 * | 8/2016 | ........... G08G 1/146 |
| DE | 102016115130 | A1 * | 2/2018 | ............ B60D 1/245 |
| JP | 2004038921 | A * | 2/2004 | ........... G05D 1/0291 |
| WO | 2009065492 | A1 | | 5/2009 |

OTHER PUBLICATIONS

English Translation of DE 102014018192A1 (Year: 2015).*
English Translation of JP 2004038921A (Year: 2004).*
English Translation of DE 102012007127A1 (Year: 2013).*
English Translation of DE 102015202466A1 (Year: 2016).*
English Translation of DE 102010011591A1 (Year: 2011).*
Just-Auto Global News, "Bosch US announces new autonomous parking technology", Aroq Limited, Jun. 8, 2016 (Year: 2016 (Year: 2016).*
Search Report for International Patent Application No. PCT/EP2017/069063; dated Nov. 7, 2017.
Office Action for Chinese Patent Application No. 201780065918.6; dated Dec. 10, 2020.

* cited by examiner

METHOD FOR OPERATING A TRANSPORTATION VEHICLE AND A CONTROL UNIT FOR CARRYING OUT THE METHOD

PRIORITY CLAIM

This patent application is a U.S. National Phase of International Patent Application No. PCT/EP2017/069063, filed 27 Jul. 2017, which claims priority to German Patent Application No. 10 2016 217 330.8, filed 12 Sep. 2016, the disclosures of which are incorporated herein by reference in their entireties.

SUMMARY

Illustrative embodiments relate to a method for operating a transportation vehicle and a control unit for carrying out the method. Furthermore, illustrative embodiments relate to a transportation vehicle with the control unit. The method for operating the transportation vehicle is used to approach a parking space with the transportation vehicle.

BRIEF DESCRIPTION OF THE DRAWINGS

The disclosed embodiments are described in detail using the accompanying drawings, in which.

DETAILED DESCRIPTION

Semi-automatic and fully automatic parking systems have been known for a number of years. Semi-automatic parking systems carry out the steering movement (lateral control) of the transportation vehicle during a semi-automatic parking process, whereas the driver continues to be responsible for the longitudinal control of the transportation vehicle, i.e., for engaging the correct gear and for operating the gas pedal and the brake. In the case of a fully automatic parking system, the system carries out both the lateral and longitudinal control during a fully automatic parking process.

Parking systems are also known, with which it is learned in a learning mode where a certain parking space (parking spot) is disposed, such as the home garage, a home parking spot, a parking spot at the place of work, etc. following the learning process, the transportation vehicle is able to recognize the position of the transportation vehicle in the vicinity of the learned parking space and to drive independently (automatically) from there to the learned parking spot. Such parking systems are also known by the terms "automatic garage parking" or "home zone parking".

With respect to the latter parking systems, extensions and modifications are known from the prior art.

Thus, for example, DE 10 2013 015 349 A1 describes a method for operating a transportation vehicle, in particular, for driving a transportation vehicle into a parking space in a parking zone that is not visible/is off-road, during which transportation vehicle surroundings data are sensed, wherein when approaching a parking space in the parking zone it is identified whether the parking space is a home parking spot or the parking zone is a home parking zone, wherein on identifying a home parking spot or a home parking zone and while the transportation vehicle is approaching the identified home parking spot or the identified home parking zone, the detected surroundings data or travel data are stored or updated.

From DE 10 2014 216 577 A1 a method for assisting a driver of a transportation vehicle is known, comprising a learning phase, in which after activation of the learning phase by the driver a driving maneuver is carried out, in which the transportation vehicle is brought from a starting position to a target position, wherein information about the starting position and information about the driving maneuver that has been carried out is stored, moreover comprising an implementation phase, wherein the driver is offered the option of activating an assistance function when the transportation vehicle is in the vicinity of the starting position, after activating the assistance function an assisted driving maneuver is carried out based on the stored information, wherein the driving maneuver is stored as directional instructions, and after activating the assistance function the transportation vehicle moves according to the stored directional instructions from the current position thereof towards the target position, wherein the surroundings of the transportation vehicle are detected, in particular, by environmental sensors of the transportation vehicle, and the driving maneuver is completed based on the surroundings information detected by the environmental sensors of the transportation vehicle.

And DE 10 2014 018 192 A1 has a method for controlling a transportation vehicle to an object, with which an intended trajectory that the transportation vehicle uses during automatic travel is determined from travel data of the transportation vehicle, wherein in the event of changed surroundings of the travel a trajectory determined from current travel data of the transportation vehicle is compared with the intended trajectory, deviations between the new trajectory and the intended trajectory are determined and a new intended trajectory is set up depending on the deviations.

Disclosed embodiments provide a method for operating a transportation vehicle that is improved compared to the previously known prior art, an improved control unit for operating a transportation vehicle, and a transportation vehicle with the improved control unit. Disclosed embodiments provide a method, the control unit and the transportation vehicle.

According to disclosed embodiments, a method is proposed for operating a transportation vehicle, in particular, for driving the transportation vehicle to a predetermined parking space, wherein a first trajectory for automatic travel of the transportation vehicle to the predetermined parking space, which was determined during manual travel of the transportation vehicle to the predetermined parking space, is stored in a memory device in the transportation vehicle, tolerance values for a deviation from the first trajectory are associated with the first trajectory, which are the maximum values by which the transportation vehicle may deviate from the first trajectory during automatic travel to the predetermined parking space, and wherein the transportation vehicle has the possibility of activating automatic travel to the predetermined parking space if the transportation vehicle is in the vicinity of the starting position of the first trajectory.

The disclosed method is characterized in that during at least one further instance of manual travel of the transportation vehicle to the predetermined parking space the further trajectory that is traversed in doing so is automatically recorded, the first trajectory and the further trajectory are compared to each other and in the case in which in relation to at least one predefinable point on the first trajectory a deviation by the further trajectory in relation to the path of the transportation vehicle is determined, the deviation is associated with the predefinable point of the first trajectory such that the determined deviation and the tolerance value associated with the predefinable point of the first trajectory are added and stored as the new tolerance value for the predefinable point of the first trajectory in the memory device in the transportation vehicle.

In the case in which a trajectory is traversed (and learned) only once, smaller tolerances in relation to the distance and the orientation in relation to the learned first trajectory must be assumed, which are the maximum by which the transportation vehicle may deviate from the learned trajectory during automatic travel to the predetermined parking space; i.e., the trajectory plus the low tolerances (left from the trajectory, right from the trajectory and in relation to the stopping point on the parking space) define a corridor along which automatic travel away is allowed. Tolerances in the range of no more than 10 cm, 15 cm or 20 cm are often assumed.

If in the case of at least one further instance of manual travel to the parking space the trajectory selected by the driver is detected automatically during this, i.e., without an intervention by the driver, and if the further trajectory deviates from the first trajectory at one or more points, it can be assumed therefrom that the further trajectory also defines a further allowed path of movement for driving to the predetermined parking space. Therefore, the deviations determined between the first trajectory and the further trajectory can be used to increase the tolerance values of the first trajectory at the relevant points. This results in a greater catch area and possibilities for improved path planning.

According to a first exemplary embodiment of the disclosed method, in the event of at least one second further instance of manual travel of the transportation vehicle to the predetermined parking space, the second further trajectory that is traversed in doing so is automatically detected, the first trajectory and the second further trajectory are compared with each other and in the case in which a deviation of the second further trajectory in relation to the travel path of the transportation vehicle is determined at one or more predefinable points of the first trajectory, the deviation is associated with the predefinable point of the first trajectory, such that the determined deviation and the tolerance value associated with the predefinable point of the first trajectory are added and stored as a new tolerance value for the predefinable point of the first trajectory in the memory device in the transportation vehicle, if the new tolerance value is greater than the already stored tolerance value.

According to the disclosed development, there is the possibility that the allowed corridor is enlarged with each iteration, whereby the reliability and availability of the function of automatically travel to a parking space are increased and the catch area can be extended.

According to a second disclosed development of the method, predefinable points that are at a fixed distance from each other, optionally a distance in the region of 5 cm and 30 cm or a distance in the region of 10 cm to 20 cm, are predefined along the first trajectory.

It has proved sufficient to check whether there is a deviation between the first trajectory and a further trajectory or not only at points that are spaced apart from each other along the first trajectory at a mutual distance in the aforementioned range. This reduces the amount of data to be detected and secured compared to a continuous comparison or to a comparison at very short intervals, without significantly reducing the accuracy of the allowed corridor.

Automatic travel to the predetermined parking space is always carried out along the first trajectory, if and as long as no obstacles are detected along the first trajectory by monitoring the surroundings by a surroundings sensing arrangement of the transportation vehicle, and automatic bypassing of an obstacle is carried out only in the case of the detection of the obstacle during automatic travel along the first trajectory to the predetermined parking space if bypassing is possible while also maintaining the tolerance values along the first trajectory that are stored in the memory device.

According to the disclosed embodiments, it can further be provided that a first trajectory and further trajectories are detected driver-specifically, are compared with each other driver-specifically, the first trajectory and larger tolerance values along the first trajectory resulting from the further trajectories are stored driver-specifically in the memory device in the transportation vehicle and automatic travel to the predetermined parking space that may be carried out is carried out driver-specifically using the driver-specifically detected and stored data.

It can also be provided that a first trajectory of manual travel to a predefinable parking space and tolerance values along the first trajectory, optionally together with characteristics of the transportation vehicle, the first trajectory and the further trajectories that are traversed during manually travel to the predetermined parking space and/or characteristics of the predetermined parking space, are transmitted to a computing device outside the transportation vehicle and are provided to the transportation vehicle and/or to other transportation vehicles by the computing device outside the transportation vehicle; and/or the disclosed method or one of the disclosed embodiments thereof is also designed to drive a transportation vehicle away from a predetermined parking space as an alternative to or in addition to driving a transportation vehicle to a predetermined parking space.

The disclosed embodiments also include a control unit for a transportation vehicle for carrying out the disclosed method or one of the disclosed embodiments thereof.

The control unit comprises a memory device and a control device that can be connected to devices in the transportation vehicle that are suitable for recording trajectories and for carrying out automatic travel to a predetermined parking space and/or automatic travel away from a predetermined parking space.

The disclosed embodiments also comprise a transportation vehicle with devices in the transportation vehicle that are suitable for recording trajectories and for carrying out automatic travel to a predetermined parking space and/or automatic travel away from a predetermined parking space. The transportation vehicle is characterized in that it comprises a control unit that is connected to the devices in the transportation vehicle.

The representations in the figures are purely schematic and not to scale. Within the figures, identical or similar elements are given the same reference character.

The exemplary embodiments described below are illustrative of the present disclosure. The present disclosure is of course not limited to the disclosed embodiments.

The features and combinations of features mentioned in the above description and the exemplary embodiments and the description of the figures mentioned in the following description of embodiments, and/or the features and combinations of features shown in the figures alone can be used not only in the respectively specified combination, but also in other combinations or on their own without departing from the scope of the present disclosure.

If in the present application "automatic" travel or "automatic" driving being carried out is mentioned, then hereunder "automatic" travel or "automatic" driving is to be understood to mean that the transportation vehicle 1 is carrying out both longitudinal and lateral control, and "partly automatic" travel or "partly automatic" driving means that the lateral control is carried out by the transportation vehicle 1 and that the longitudinal control is carried out by the driver, i.e., the driver is responsible for engaging the appropriate gear, the speed and acceleration including the braking process. "Automatic" travel or "automatic" driving can also be carried out after the driver has left the transportation vehicle 1.

From the prior art, methods and devices (and the possible interactions thereof) with which "automatic" parking and unparking that are relevant to the present application can be carried out—and on which the present disclosure builds—have long been known to persons skilled in the art. Against this background, it does not seem necessary to go into this method and these devices and to transportation vehicles equipped therewith in this application.

A "predetermined parking space" is to be understood to mean, for example, a parking spot, a garage, a garage parking space, etc., on which a driver has already parked the transportation vehicle once and from which it is to be assumed that he will approach the parking space in the future a further number of times. Such a "predetermined parking space" can, for example, be a parking space at the place of residence or at work.

The disclosed method is based on a configuration in which a first trajectory 4 for automatic travel of the transportation vehicle 1 to the predetermined parking space 2 that has been acquired (in a preliminary process) while manually driving the transportation vehicle 1 to the predetermined parking space 2 is already stored in a memory device 3 in the transportation vehicle.

This detection of a first trajectory 4 can be carried out in a way that may already be known from the prior art, e.g., automatically if it has been determined that the parking space 2 that is being approached is being approached again by the transportation vehicle 1 using recorded surroundings data (e.g., coordinates along a path determined by a global navigation satellite system (GNSS), images of the surroundings of the transportation vehicle recorded by camera devices in the transportation vehicle, the stop position, etc.), or manually by the driver starting the detection (the recording) of the first trajectory 4, e.g., by an operator action using a device provided for this in the transportation vehicle or a voice command, and the detection may be ended after reaching the parking space 2 (the stop position). Following automatic detection of the first trajectory 4, it can be provided that this is signaled to the driver by a signaling device in the transportation vehicle (display screen, loudspeaker, etc.) and he can then decide (e.g., by a confirmation action) whether the travel path that has just been traversed to the parking space is to be stored as the first trajectory 4 for a predetermined parking space 2 in the memory device 3 in the transportation vehicle or not. It can likewise be provided that a driver marks the parking space involved as one for which he does not want detection of a first trajectory 4 (wherein it can further be provided that he can change this decision again at a future point in time).

The starting point of the first trajectory 4 can also be determined in a manner that may already be known from the prior art, e.g., automatically, by selecting as the starting point of the first trajectory 4 a definable position at a predefinable distance from the (already repeatedly approached) predetermined parking space 2, for example, 10 m, 15 m, 20 m, 30 m, 40 m, 50 m, 60 m, 70 m, 80 m, 90 m or 100 m, etc., wherein the known position (coordinates) of the predetermined parking space 2 can be used for the calculation of the predefinable distance. Alternatively or additionally, it can be provided for this that the starting point of the first trajectory 4 can also be selected or determined manually by a driver, for example, by a corresponding operator action with a device provided for this in the transportation vehicle or a voice command. A manual selection can be beneficial, insofar that as a result a position of the transportation vehicle 1 is selected as the starting point for the first trajectory 4 that is subjectively viewed by the driver of the transportation vehicle 1 as a suitable start of a parking process (or as a suitable end of an unparking process) in relation to the predetermined parking space 2. In the event of future automatic travel to the predetermined parking space 2 or away from the predetermined parking space 2, the travel thus starts or ends at least in the close surroundings of the point that is envisaged by the driver for this.

By the first trajectory 4, a region that can be travelled over is determined on which the transportation vehicle 1 can be driven from a starting point to the predetermined parking space 2 without the transportation vehicle 1 colliding with any, in particular, permanently present, obstacles (such as, for example, buildings, trees, traffic signs, etc.) in doing so.

At the same time, the first trajectory 4 defines a travel path and a stopping position (including the orientation of the transportation vehicle 1) on the predetermined parking space 2, from which it can be assumed that these are correspondingly perceived by the driver of the transportation vehicle 1 as his ideas and personal requirements (for example, in the event of an increased distance from an adjacent transportation vehicle or from a wall that is necessary because of a physical handicap).

Against this background, it is provided that in the case of automatic travel to and onto the predetermined parking space 2 (and possibly also travel away from the predetermined parking space 2), in principle a travel path is selected that corresponds to the first trajectory 4.

The detection of whether a transportation vehicle 1 is in the vicinity of the starting point of the first trajectory 4, i.e., within an allowed starting area 6 for automatic travel, can be carried out in a manner that may already be known from the prior art, for example, based on the coordinates of the transportation vehicle 1 determined by using a GNSS or based on a comparison of image data that is present in the transportation vehicle 1 and that was recorded at the starting point of detecting the first trajectory 4, with currently acquired image data of the surroundings of the transportation vehicle 1.

As the transportation vehicle 1 will regularly not take up the starting point that was specified during the recording of the first trajectory 4 exactly at the start of automatic travel, it will often be necessary that in a first section of the automatic travel a travel path of the transportation vehicle 1 is selected that approximates to the first trajectory 4, so that in the remaining section of the automatic travel the travel path then corresponds to the first trajectory 4.

Comparatively small tolerance values 5, 5' for a deviation from the first trajectory 4 are associated with the recorded first trajectory of a transportation vehicle 1 to allow the transportation vehicle 1 to deviate from the trajectory 4 to the maximum extent during automatic travel. The tolerance values 5, 5' can, for example, be fixedly predefined and be based on empirical experience, for example, on the distance that an average driver regularly maintains from a curb, another road boundary, a traffic sign, a wall in front of the transportation vehicle 1, etc.

To be able to increase the comparatively small tolerance values 5, 5', according to the present disclosure it is provided that in the case of at least one further instance of manual travel of the transportation vehicle 1 to the predetermined parking space 2 the further trajectory 7 that is traversed in doing so is automatically detected, the first trajectory 4 and the further trajectory 7 are compared with each other and in the case in which a deviation by the further trajectory 7 relative to the travel path of the transportation vehicle 1 is determined in relation to at least one predefinable point of the first trajectory 4, the deviation is associated with the predefinable point of the first trajectory 4 such that the determined deviation and the tolerance value associated with the predefinable point of the first trajectory 4 are added and stored in the memory device 3 in the transportation vehicle as a new tolerance value for the predefinable point of the first trajectory 4.

Figure 1:
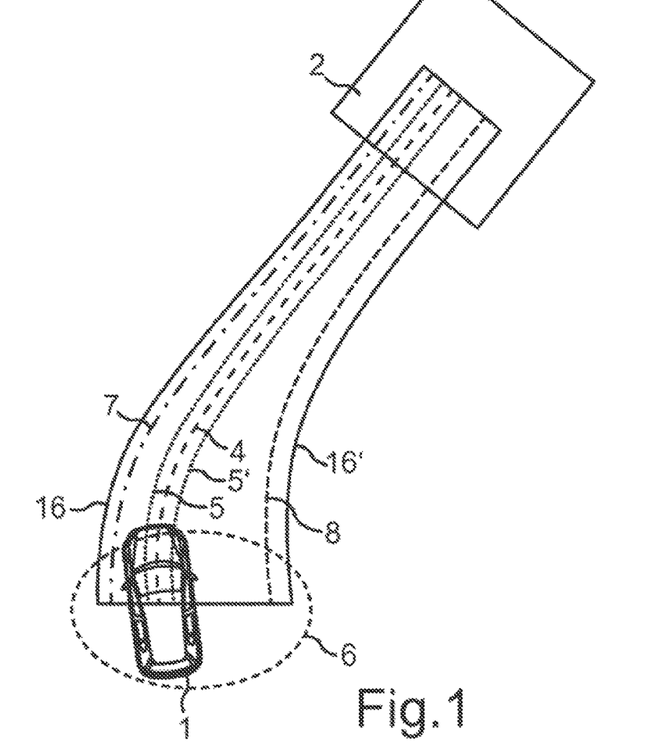
FIG. 1 shows an exemplary representation as an example of the increase in the tolerance ranges of the first trajectory owing to two further traversed trajectories.

As shown schematically in FIG. 1, by the disclosed method the original tolerance value 5 shown on the left in FIG. 1 can be expanded to the tolerance limit 16 shown on the left by the further trajectory 7. As a result, due to the further trajectory 7 alone there is a "trajectory-region" available to the transportation vehicle 1 that extends from the tolerance value 5' shown on the right in FIG. 1 to the tolerance limit 16 shown on the left.

According to the present disclosure, the number of further trajectories 7, 8 is not limited and in principle any number of further trajectories 7, 8 can be evaluated during manual travel to the predetermined parking space 2 and corresponding new tolerance values or tolerance limits can be entered into the database 3 in the transportation vehicle.

In FIG. 1 a second further trajectory 8 is represented schematically and by way of example, by which the tolerance value 5' shown on the right could be extended to the tolerance limit 16' shown on the right.

The association of a deviation of a further trajectory 7, 8 at a "predefinable" point of the first trajectory 4 can be carried out in any suitable manner, for example, by forming a line from a predefined point of the first trajectory 4 perpendicular to the tangent specified at the predetermined point of the first trajectory 4 and using the distance from the first trajectory 4 to the intercept of the perpendicular line with the further trajectory 7, 8 as the value for the deviation of the further trajectory 7, 8 from the first trajectory 4.

It has proven sufficient to check only at points that are spaced apart along the first trajectory 4 whether there is a deviation therefrom by a further trajectory 7, 8, wherein as a suitable distance of the respective points from each other, for example, a distance can be selected that lies in the range between 5 cm and 30 cm, optionally in the range from 10 cm to 20 cm. The tolerance ranges or the tolerance limits specified between the predetermined points of the first trajectory 4 can then be approximated by interpolation, for example.

By using only discrete points that are spaced apart from each other along the first trajectory 4, the amount of data to be recorded and secured is reduced in comparison with continuous comparison or with comparison at very short intervals, without significantly reducing the accuracy of the allowed corridor.

The tolerance limits 16, 16' expanded by further trajectories 7, 8 can be used during automatic travel towards the predetermined parking space 2 along the first trajectory to automatically bypass an obstacle 4 that has been detected by monitoring the surroundings by a surroundings sensing arrangement 11 of the transportation vehicle 1 and wherein a collision between the transportation vehicle 1 and the obstacle would occur during (further) travel along the first trajectory 4.

If such an automatic bypass itself is not possible by using the expanded tolerance limits 16, 16', the automatic travel is beneficially not started or automatic travel that has already started is at least interrupted, and this is signaled to the driver by a device in the transportation vehicle.

The driver can then either carry out a manual bypass around the obstacle, wherein after bypassing the automatic approach can be started or continued, or—if possible—the detected obstacle can be removed at least so far that the automatic travel to the predetermined parking space 2 can be started or continued.

The present disclosure also includes a disclosed embodiment of the method, with which a first trajectory 4 and further trajectories 7, 8 are recorded driver-specifically, compared with each other driver-specifically, the first trajectory 4 and larger tolerance values along the first trajectory 4 that arise because of the further trajectories 7, 8 are stored driver-specifically in the memory device 3 in the transportation vehicle and automatic travel to the predetermined parking space 2 that may be carried out is carried out driver-specifically by using the driver-specifically recorded and stored data.

Devices and methods for detecting a specific driver of a transportation vehicle 1 have long been known from the prior art to persons skilled in the art, for example, such devices and methods that use driver-specific data present in the transportation vehicle key that is being used, that use facial and/or voice recognition in the interior of the transportation vehicle, that carry out suitable operating actions of a driver, etc., so that there is no need to go into this in detail in the present application.

A driver-specific exemplary embodiment of the disclosed method can be beneficial in relation to different facets. Thus, for example, a driver can be of a very careful nature, so that during manual travel to the predetermined parking space 2 he always selects very similar further trajectories 7, 8 that run comparatively closely along the first trajectory 4. As a result, only comparatively small expanded tolerance limits 16, 16' also result for the driver.

With a driver-specific exemplary embodiment of the disclosed method, with the driver only "very cautious" bypassing of a detected obstacle is also carried out during automatic travel, whereby possible states of restlessness or anxiety of this driver can be avoided. As further examples of the benefits of a driver-specific exemplary embodiment of the disclosed method, an increased need for space for exiting the transportation vehicle 1 in comparison with an average driver—as already mentioned above—or a driver that regularly wants to carry out checks in the (front) engine compartment of the transportation vehicle 1 and therefore regularly parks at a larger distance from a wall of the predetermined parking space 2 than is the case with an average driver, can be mentioned.

According to the present disclosure, it can also be provided that a first trajectory 4 of manual travel to a predefinable parking space and tolerance values along the first trajectory 4, optionally together with characteristics of the transportation vehicle 1 that is driven on the first trajectory 4 and the further trajectories 7, 8 during manual travel to the predetermined parking space 2 and/or characteristics of the predetermined parking space 2 are transmitted to a computing device that is outside the transportation vehicle (for example, a server that is connected to the Internet) and are provided by the computing device outside the transportation vehicle to the transportation vehicle 1 and/or other transportation vehicles.

The transmission of the data to the computing device outside the transportation vehicle can be carried out by using a radio system, for example, by using a mobile radio standard. For this purpose, of course a corresponding device is to be provided in the transportation vehicle 1 or a corresponding device (for example, a mobile telephone) is to be associated with the transportation vehicle 1. In the latter case, the transmission of the data from the transportation vehicle 1 to the device associated therewith can also be carried out by a wired connection (for example, a bus connection, for example, USB (Universal Serial Bus), CAN (Controlled Area Network)) or a short-range connection (WLAN (Wireless Local Area Network), NFC (Near Field Communication), BLUETOOTH®, infrared light). The data transmitted to the device associated with the transportation vehicle 1 can then be transmitted from the device to the computing device outside the transportation vehicle by using a mobile radio standard, for example.

Trajectories 4, 7, 8 represent the curve paths that a transportation vehicle 1 has traversed. However, the "travel path" that is actually necessary for travelling to a predetermined parking space 2 only results by taking into account characteristics of the transportation vehicle 1 that has traversed the trajectories 4, 7, 8. The characteristics include the width and the height of the transportation vehicle 1, for example. The actually available travel region in any case can thus be calculated from the (successful) trajectories 4, 7, 8 and the characteristics of the transportation vehicle 1.

Apart from the coordinates of the predetermined parking space 2, no further information in relation to the predetermined parking space 2, such as, for example, the length, width and height thereof (for example, in the case of a garage or a garage parking space) results from the stopping positions of the transportation vehicle 1 on the predetermined parking space 2 resulting from the trajectories 4, 7, 8.

If according to an exemplary embodiment of the disclosed method the data transmitted from the transportation vehicle 1 to a computing device outside the transportation vehicle are in turn only provided to the same transportation vehicle 1, then it is sufficient if the first trajectory 4 and the expanded tolerance values along the first trajectory 4, which have resulted from further trajectories 7, 8 recorded during manual travel, are transmitted to the computing device outside the transportation vehicle. If the data are transmitted back to the transportation vehicle 1 from the computing device outside the transportation vehicle, then the data can easily be used again for automatic travel to the predetermined parking space 2, because the data have already proved suitable for the specific transportation vehicle 1 in the past.

Such a transmission of data to a computing device outside the transportation vehicle and subsequently downloading the data to the transportation vehicle 1 are, for example, beneficial if there is only a limited data memory in the transportation vehicle 1 (for example, for 4 or 5 predetermined parking spaces 2), but the transportation vehicle is travelling to a larger number of predetermined parking spaces 2. In such a case, data relating to one or more predetermined parking spaces 2 that are not currently required can be uploaded from the transportation vehicle 1 to a computing device outside the transportation vehicle and only downloaded back from the computing device outside the transportation vehicle when required and used in the transportation vehicle 1.

If data that have been detected once relating to a predetermined parking space 2, a first trajectory 4 and tolerance values along the first trajectory 4 for automatic travel to the predetermined parking space 2 are to be provided to further transportation vehicles, so that after downloading the corresponding data the further transportation vehicles can travel along a suitable trajectory automatically to the predetermined parking space 2 without previously learning about or exiting the predetermined parking space 2, it is beneficial or even necessary if characteristics of the transportation vehicle 1 that have traversed the first trajectory 4 and the further trajectories 7, 8 during manual travel to the predetermined parking space 2 and/or characteristics of the predetermined parking space 2 are also transmitted to the computing device outside the transportation vehicle.

The driving path that is actually available in any case can be determined from the characteristics of the transportation vehicle 1 in connection with the first trajectory 4 and the tolerance values associated therewith. The driving path that is available in any case can then be compared with the driving path that results because of the characteristics of the further transportation vehicle along the first trajectory 4. A corresponding calculation can be carried out by a computing device of the further transportation vehicle, for example.

If the result of the comparison is that at a point along the approach to the predetermined parking space 2 the further transportation vehicle requires a larger driving path than that which results from the data transmitted to the external computing device, the further transportation vehicle cannot carry out automatic travel to and onto the predetermined parking space 2 based on the data.

The same applies if the characteristics relating to the predetermined parking space 2 do not enable parking the further transportation vehicle on the predetermined parking space 2 (for example, since the further transportation vehicle has too great a length, width and/or height).

The disclosed method and the disclosed developments and embodiments thereof are of course not limited to travel to and onto the predetermined parking space 2 (parking process), but can of course also be used for automatically travelling away from a predetermined parking space 2 (unparking process), i.e., the disclosed method and the disclosed developments and embodiments thereof can also be designed for automatically travelling away from a predetermined parking space 2.

For this purpose, for example, a first trajectory 4 for travel to and onto the predetermined parking space 2 and a first trajectory 4 for travel away from the predetermined parking space 2 can be stored in the memory device 3 in the transportation vehicle. Such mutually different first trajectories 4 are, for example, useful if a transportation vehicle 1 initially travels forwards in a left turn towards the predetermined parking space 2 during a parking process, for example, but is to travel in reverse to the right away from the predetermined parking space 2 at the end of an unparking process.

Figure 2:
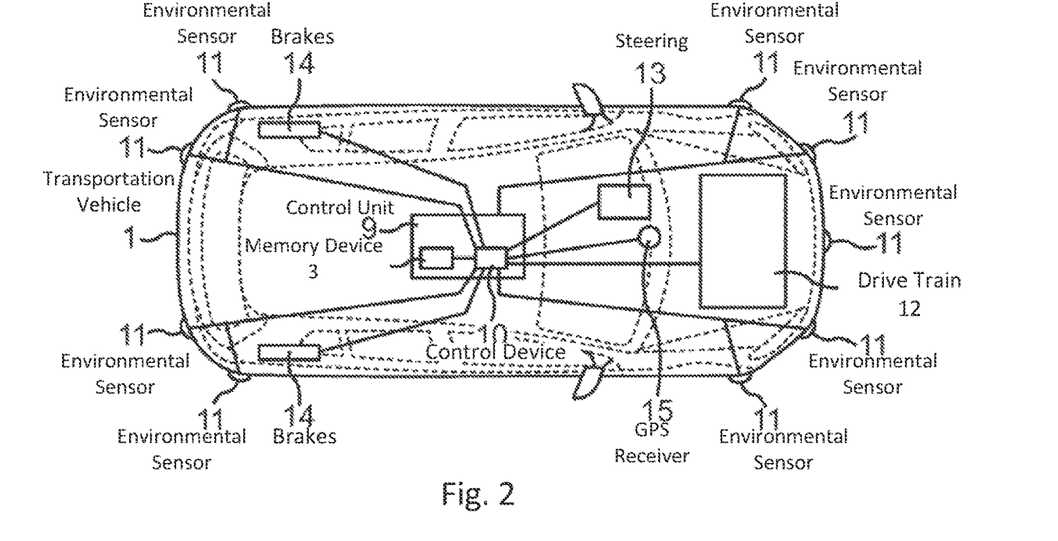
FIG. 2 shows an exemplary representation of a disclosed transportation vehicle.

The present disclosure also includes a control unit 9 for a transportation vehicle 1 comprising a memory device 3 and a control device 10 that can be connected to devices in the transportation vehicle 11, 12, 13, 14, 15 that are suitable for recording trajectories 4, 7, 8 and for carrying out automatic travel to a predetermined parking space 2 and/or automatic travel away from a predetermined parking space 2.

The control unit 9 is characterized in that it is designed to carry out the disclosed method or one of the disclosed developments and embodiments thereof.

The devices in the transportation vehicle 11, 12, 13, 14, 15 can, for example, be environmental sensors 11 (radar sensors, ultrasonic sensors, camera devices, etc.), the drive train 12 (including engine and gearbox), the steering 13, the brakes 14, a GPS receiver 15, etc. This list is not to be considered exhaustive and the control device 10 can be connected to further devices in the transportation vehicle that a person skilled in the art considers useful or necessary for the purpose according to the disclosure.

The disclosed embodiments also include a transportation vehicle 1 with devices in the transportation vehicle 11, 12, 13, 14, 15 that are suitable for recording trajectories and for carrying out automatic travel to a predetermined parking space 2 and/or automatic travel away from a predetermined parking space 2.

The transportation vehicle 1 is characterized in that it comprises a control unit 9 that is connected to the devices in the transportation vehicle 11, 12, 13, 14, 15.

In addition to the mentioned devices in the transportation vehicle 11, 12, 13, 14, 15, the transportation vehicle can comprise further useful and/or necessary devices, for example, an analysis device for analyzing image data acquired by one or more camera devices, a navigation device for overlaid representation of the trajectory(ies) with digital road data, etc. The further devices can also be connected to the control unit 9.

According to the present disclosure, further embodiments and modifications are possible, for example, it can be provided that a first trajectory 4 can be cleared from the memory device 3 in the transportation vehicle by a driver and replaced by a new first trajectory 4. This is, for example, useful if a driver considers an existing first trajectory 4 for a predetermined parking space 2 not optimal or no longer optimal or if the conditions have changed in relation to a predetermined parking space 2 (for example, if an access to the predetermined parking space 2 within the first trajectory 4 has become narrower or moved, a permanent obstacle along the first trajectory 4 is specified, etc.).

A re-detection of a first trajectory 4 can be carried out according to the originally provided method for storing a first trajectory 4 in the memory device 3 in the transportation vehicle, i.e., either automatically during manual travel or because of a corresponding operator action by the driver.

REFERENCE CHARACTER LIST 1 transportation vehicle
2 parking space
3 memory device in the transportation vehicle
4 first trajectory
5, 5' tolerance values
6 starting region for automatic travel
7 further trajectory
8 second further trajectory
9 control unit
10 control device
11 environmental sensors
12 drive train
13 steering
14 brakes
15 GPS receiver
16, 16' extended tolerance limit

The invention claimed is:

1. A method for operating a transportation vehicle, the method comprising:
    storing, in a memory device in the transportation vehicle, a first trajectory for automatic travel of the transportation vehicle to a predetermined parking space that was detected during manual travel of the transportation vehicle to the predetermined parking space;
    associating, with the first trajectory, tolerance values for a deviation from the first trajectory, which are maximum values by which the transportation vehicle deviates from the first trajectory during automatic travel to the predetermined parking space;
    activating automatic travel, by the transportation vehicle, to the predetermined parking space in response to the transportation vehicle being in an allowed starting area for automatic travel of a starting position of the first trajectory;
    during at least one further instance of manual travel of the transportation vehicle to the predetermined parking space, automatically recording a further trajectory, and comparing the first trajectory and the further trajectory; and
    in response to a determined deviation by the further trajectory relative to a travel path of the transportation vehicle being determined in relation to at least one predefinable point of the first trajectory, associating the determined deviation with the predefinable point of the first trajectory so the determined deviation and the tolerance values associated with the predefinable point of the first trajectory are added and stored in the memory device in the transportation vehicle as a new tolerance value for the predefinable point of the first trajectory.

2. The method of claim 1, wherein, during at least one second further instance of manual drive of the transportation vehicle to the predetermined parking space, the second further trajectory that is traversed in doing so is automatically recorded, the first trajectory and the second further trajectory are compared with each other and, in response to one or more of the at least one predefinable point of the first trajectory a deviation by the second further trajectory relative to the travel path of the transportation vehicle is determined, the deviation is associated with the at least one predefinable point of the first trajectory so the determined deviation and the tolerance value associated with the at least one predefinable point of the first trajectory are added and stored in the memory device in the transportation vehicle as a second new tolerance value for the at least one predefinable point of the first trajectory in response to the second new tolerance value being greater than the already stored tolerance value.

3. The method of claim 1, wherein the at least one predefinable point includes multiple predefinable points that are predefined along the first trajectory at a fixed distance apart.

4. The method of claim 1, wherein automatic travel to the predetermined parking space is always carried out along the first trajectory in response to no obstacles being detected along the first trajectory by monitoring surroundings by using a surroundings sensing arrangement of the transportation vehicle.

5. The method of claim 4, wherein, in response to detecting an obstacle along the first trajectory during automatic travel to the predetermined parking space, automated bypassing of the obstacle is carried out in response to such bypassing being possible while maintaining the tolerance values along the first trajectory that are stored in the memory device.

6. The method of claim 1, wherein the first trajectory and further trajectories are recorded driver-specifically, are compared with each other driver-specifically, the first trajectory and larger tolerance values compared to the associated tolerance values along the first trajectory resulting because the further trajectories are driver-specifically stored in the memory device in the transportation vehicle and automatic travel to the predetermined parking space is carried out driver-specifically by using driver-specifically recorded and stored data.

7. The method of claim 1, wherein the first trajectory of manual travel to a predefinable parking space and tolerance values along the first trajectory, together with characteristics of the transportation vehicle that traverses the first trajectory and the further trajectories during manual travel to the predetermined parking space and/or characteristics of the predetermined parking space, are transmitted to a computing device outside the transportation vehicle and are provided by the computing device outside the transportation vehicle to the transportation vehicle and/or other transportation vehicles; and/or
the method enables the transportation vehicle to travel to the predetermined parking space and for the transportation vehicle to travel away from the predetermined parking space.

8. A control unit for a transportation vehicle, the control unit comprising a memory device and a control device connected to devices in the transportation vehicle for recording trajectories and for carrying out automatic travel to a predetermined parking space or automatic travel away from the predetermined parking space, wherein the control unit carries out a method for operating a transportation vehicle wherein a first trajectory for automatic travel of the transportation vehicle to the predetermined parking space that is detected during manual travel of the transportation vehicle to the predetermined parking space is stored in the memory device in the transportation vehicle, tolerance values for a deviation from the first trajectory, which are maximum values by which the transportation vehicle deviates from the first trajectory during automatic travel to the predetermined parking space, are associated with the first trajectory, and wherein the transportation vehicle has a capability of activating automatic travel to the predetermined parking space in response to the transportation vehicle being in a an allowed starting area for automatic travel of a starting position of the first trajectory,
wherein, during at least one further instance of manual travel of the transportation vehicle to the predetermined parking space a further trajectory that is traversed in doing so is automatically recorded, the first trajectory and the further trajectory are compared with each other and,
wherein, in response to a determined deviation by the further trajectory relative to a travel path of the transportation vehicle being determined in relation to at least one predefinable point of the first trajectory, the determined deviation is associated with the predefinable point of the first trajectory so the determined deviation and the tolerance values associated with the predefinable point of the first trajectory are added and stored in the memory device in the transportation vehicle as a new tolerance value for the predefinable point of the first trajectory.

9. The control unit of claim 8, wherein, during at least one second further instance of manual drive of the transportation vehicle to the predetermined parking space, the second further trajectory that is traversed in doing so is automatically recorded, the first trajectory and the second further trajectory are compared with each other and, in response to one or more of the at least one predefinable point of the first trajectory a deviation by the second further trajectory relative to the travel path of the transportation vehicle is determined, the deviation is associated with the at least one predefinable point of the first trajectory so the determined deviation and the tolerance value associated with the at least one predefinable point of the first trajectory are added and stored in the memory device in the transportation vehicle as a second new tolerance value for the at least one predefinable point of the first trajectory in response to the second new tolerance value being greater than the already stored tolerance value.

10. The control unit of claim 8, wherein the at least one predefinable point includes multiple predefinable points that are predefined along the first trajectory at a fixed distance apart.

11. The control unit of claim 8, wherein automatic travel to the predetermined parking space is always carried out along the first trajectory in response to no obstacles being detected along the first trajectory by monitoring the surroundings by using a surroundings sensing arrangement of the transportation vehicle.

12. The control unit of claim 11, wherein, in response to detecting an obstacle along the first trajectory during automatic travel to the predetermined parking space, automated bypassing of the obstacle is carried out in response to such bypassing being possible while maintaining the tolerance values along the first trajectory that are stored in the memory device.

13. The control unit of claim 8, wherein the first trajectory and further trajectories are recorded driver-specifically, are compared with each other driver-specifically, the first trajectory and larger tolerance values compared to the associated tolerance values along the first trajectory resulting because the further trajectories are driver-specifically stored in the memory device in the transportation vehicle and automatic travel to the predetermined parking space is carried out driver-specifically by using driver-specifically recorded and stored data.

14. The control unit of claim 8, wherein the first trajectory of manual travel to a predefinable parking space and tolerance values along the first trajectory, together with characteristics of the transportation vehicle that traverses the first trajectory and the further trajectories during manual travel to the predetermined parking space and/or characteristics of the predetermined parking space, are transmitted to a computing device outside the transportation vehicle and are provided by the computing device outside the transportation vehicle to the transportation vehicle and/or other transportation vehicles; and/or
wherein the transportation vehicle is enabled to travel to the predetermined parking space and for the transportation vehicle to travel away from the predetermined parking space.

15. A transportation vehicle, comprising:
devices in the transportation vehicle for recording trajectories and for carrying out automatic travel to a predetermined parking space or automatic travel away from the predetermined parking space; and
a control unit that is connected to the devices in the transportation vehicle, wherein the control unit comprises a memory device and a control device connected to the devices in the transportation vehicle for recording trajectories and for carrying out automatic travel to the predetermined parking space or automatic travel away from the predetermined parking space, wherein the control unit carries out a method for operating the transportation vehicle wherein a first trajectory for automatic travel of the transportation vehicle to the predetermined parking space that is detected during manual travel of the transportation vehicle to the predetermined parking space is stored in a memory device in the transportation vehicle, tolerance values for a deviation from the first trajectory, which are maximum values by which the transportation vehicle deviates from the first trajectory during automatic travel to the predetermined parking space, are associated with the first trajectory, and wherein the transportation vehicle has a capability of activating automatic travel to the predetermined parking space in response to the transportation vehicle being in the allowed starting area for automatic travel of the starting position of a first trajectory, wherein, during at least one further instance of manual travel of the transportation vehicle to the predetermined parking space the further trajectory that is traversed is automatically recorded, the first trajectory and the further trajectory are compared with each other and wherein, in response to a determined deviation by the further trajectory relative to a travel path of the transportation vehicle being determined in relation to at least one predefinable point of the first trajectory, the determined deviation is associated with the predefinable point of the first trajectory so the determined deviation and the tolerance values associated with the predefinable point of the first trajectory are added and stored in the memory device in the transportation vehicle as a new tolerance value for the predefinable point of the first trajectory.

16. The transportation vehicle of claim 15, wherein, during at least one second further instance of manual drive of the transportation vehicle to the predetermined parking space, a second further trajectory that is traversed in doing so is automatically recorded, the first trajectory and the second further trajectory are compared with each other and, in response to one or more predefinable points of the first trajectory a deviation by the second further trajectory relative to the travel path of the transportation vehicle is determined, the deviation is associated with the at least one predefinable point of the first trajectory so the determined deviation and the tolerance value associated with the at least one predefinable point of the first trajectory are added and stored in the memory device in the transportation vehicle as a second new tolerance value for the predefinable point of the first trajectory in response to the second new tolerance value being greater than the already stored tolerance value.

17. The transportation vehicle of claim 15, wherein the predefinable points are predefined along the first trajectory at a fixed distance apart.

18. The transportation vehicle of claim 15, wherein automatic travel to the predetermined parking space is always carried out along the first trajectory in response to no obstacles being detected along the first trajectory by monitoring surroundings by using a surroundings sensing arrangement of the transportation vehicle.

19. The transportation vehicle of claim 18, wherein, in response to detecting an obstacle along the first trajectory during automatic travel to the predetermined parking space, automated bypassing of the obstacle is carried out in response to such bypassing being possible while maintaining the tolerance values along the first trajectory that are stored in the memory device.

20. The transportation vehicle of claim 15, wherein the first trajectory and further trajectories are recorded driver-specifically, are compared with each other driver-specifically, the first trajectory and larger tolerance values compared to the associated tolerance values along the first trajectory resulting because the further trajectories are driver-specifically stored in the memory device in the transportation vehicle and automatic travel to the predetermined parking space is carried out driver-specifically by using driver-specifically recorded and stored data.

21. The transportation vehicle of claim 15, wherein the first trajectory of manual travel to a predefinable parking space and tolerance values along the first trajectory, together with characteristics of the transportation vehicle that traverses the first trajectory and the further trajectories during manual travel to the predetermined parking space and/or characteristics of the predetermined parking space, are transmitted to a computing device outside the transportation vehicle and are provided by the computing device outside the transportation vehicle to the transportation vehicle and/or other transportation vehicles; and/or wherein the transportation vehicle is enabled to travel to the predetermined parking space and for the transportation vehicle to travel away from the predetermined parking space.

* * * * *